United States Patent
Tateno et al.

[11] Patent Number: 5,937,146
[45] Date of Patent: Aug. 10, 1999

[54] BINARIZATION PROCESSING APPARATUS AND METHOD

[75] Inventors: Tetsuya Tateno, Hadano; Atsushi Furuya, Sagamihara, both of Japan

[73] Assignee: Canon Kabushiki Kaisha, Tokyo, Japan

[21] Appl. No.: 08/705,969

[22] Filed: Aug. 30, 1996

[30] Foreign Application Priority Data

Sep. 7, 1995 [JP] Japan .................................... 7-229942

[51] Int. Cl.$^6$ .............................. G06F 15/00; H04N 1/40; H04N 9/64
[52] U.S. Cl. ..................... 395/109; 395/115; 395/116; 358/456; 358/466; 348/715; 348/716
[58] Field of Search .................................... 395/109, 115, 395/116, 166; 358/456, 465, 466, 474; 345/103, 87, 96, 186; 348/407, 715, 716, 717; 355/47, 48, 50

[56] References Cited

U.S. PATENT DOCUMENTS

| | | | |
|---|---|---|---|
| 4,982,294 | 1/1991 | Morton et al. | 358/465 |
| 5,245,444 | 9/1993 | Hashimoto | 358/445 |
| 5,271,070 | 12/1993 | Truong et al. | 382/50 |
| 5,353,405 | 10/1994 | Doi et al. | 395/166 |
| 5,384,581 | 1/1995 | Ikeda | 348/717 |
| 5,469,228 | 11/1995 | Kim et al. | 348/715 |
| 5,638,188 | 6/1997 | Moro et al. | 358/456 |
| 5,649,172 | 7/1997 | Tang | 395/166 |
| 5,654,773 | 8/1997 | Kajimoto et al. | 348/717 |
| 5,657,044 | 8/1997 | Makino | 345/103 |

FOREIGN PATENT DOCUMENTS

| | | |
|---|---|---|
| 0205712A2 | 12/1986 | European Pat. Off. |
| 0392781A2 | 10/1990 | European Pat. Off. |
| 0664643A2 | 7/1995 | European Pat. Off. |
| WO9208314 | 5/1992 | WIPO |

*Primary Examiner*—Edward L. Coles
*Assistant Examiner*—Mark Wallerson
*Attorney, Agent, or Firm*—Fitzpatrick, Cella, Harper & Scinto

[57] ABSTRACT

A binarization processing apparatus for converting multi-value image data into binary image data is constructed by pixel groups in which pixels to be binarized are divided into a plurality of groups, a plurality of memories which correspond to the pixel groups and hold data in a binarization processing step, a control unit which performs the reading operation for one of the plurality of memories and simultaneously performs the writing operation for the other memory, and a unit for performing the converting process on the basis of an error diffusing method. The plurality of memories have a single common input/output port.

9 Claims, 6 Drawing Sheets

BINARIZATION PROCESSING APPARATUS AND METHOD

BACKGROUND OF THE INVENTION

1. Field of the Invention

The invention relates to binarization processing apparatus and method for converting multi-value data such as image data having a gradation which is used in an image forming apparatus such as display apparatus, printer, or the like into binary data and, more particularly, to binarization processing apparatus and method suitable to binarize a half-tone image.

2. Related Background Art

As an explanation of a conventional binarization processing apparatus for binarizing multi-value data such as a half-tone image, a binarizing process according to an error diffusing method will now be described as an example. According to an error diffusing process, by deciding a color by a threshold value for multi-value data having a gradation indicative of a density and distributing a difference between a density value of the decided color and a density value of an actual pixel as an error to pixels around a target pixel, the binarizing process is performed while preserving the density of the multi-value data.

A display apparatus having a binarization processing apparatus has already been filed to the United States Patent and Trademark Office on Oct. 5, 1994, as application Ser. No. 318,299.

Figure 1:
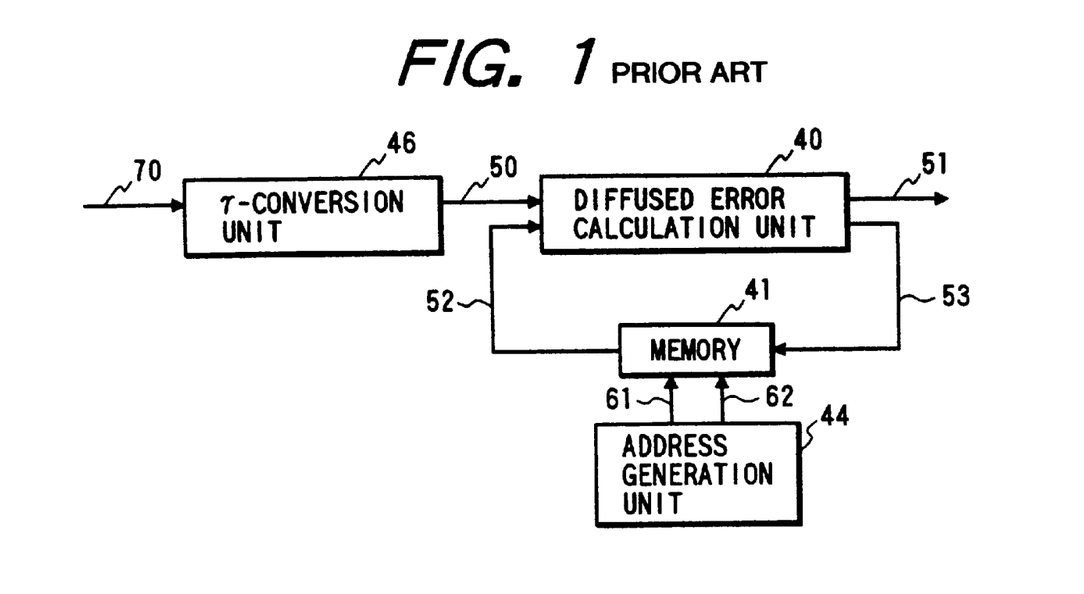
FIG. 1 is a diagram showing an example of a conventional binarization processing apparatus.

FIG. 1 shows an example of a conventional binarization processing apparatus according to the error diffusing method. In FIG. 1, reference numeral 40 denotes a diffused error calculation unit; 41 a memory for storing errors to be distributed (divisionally supplied) to a next line; 44 an address generation unit for supplying a write address and a read address to the memory; 50 a signal line for inputting a multi-value image; 51 a signal line for outputting a converted binary image; 52 a signal line for reading out errors distributed from a preceding line from the memory; 53 a signal line for writing errors to be distributed to the next line into the memory; 61 a signal line for supplying the write address to the memory; and 62 a signal line for supplying the read address.

In this instance, fundamental processes of the error diffusing method will now be explained by using FIGS. 2, 3, and 4. According to the error diffusing method, the multi-value image is binarized by distributing errors of a target pixel to the peripheral pixels in accordance with a value of an error diffusing mask.

Figure 2:
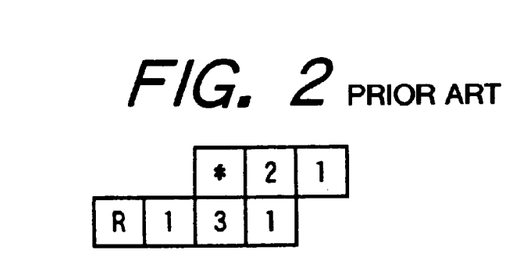
FIG. 2 is a diagram showing an example of an error diffusing mask.

FIG. 2 is a diagram showing an example of the error diffusing mask. In the diagram, * denotes a target pixel, a numerical value denotes a value indicating errors of which number of times of a value obtained by shifting the value of the target pixel to the right by three bits (an arithmetic operation of ⅛ by a bit arithmetic operation) are distributed to the pixels around the target pixel, and R denotes that the remaining errors of the errors distributed according to the numerical value are distributed. Namely, R indicates that a weight corresponding to the numerical value in FIG. 2 is added to the errors and the weighted errors are distributed to each of the peripheral pixels.

Figure 3:
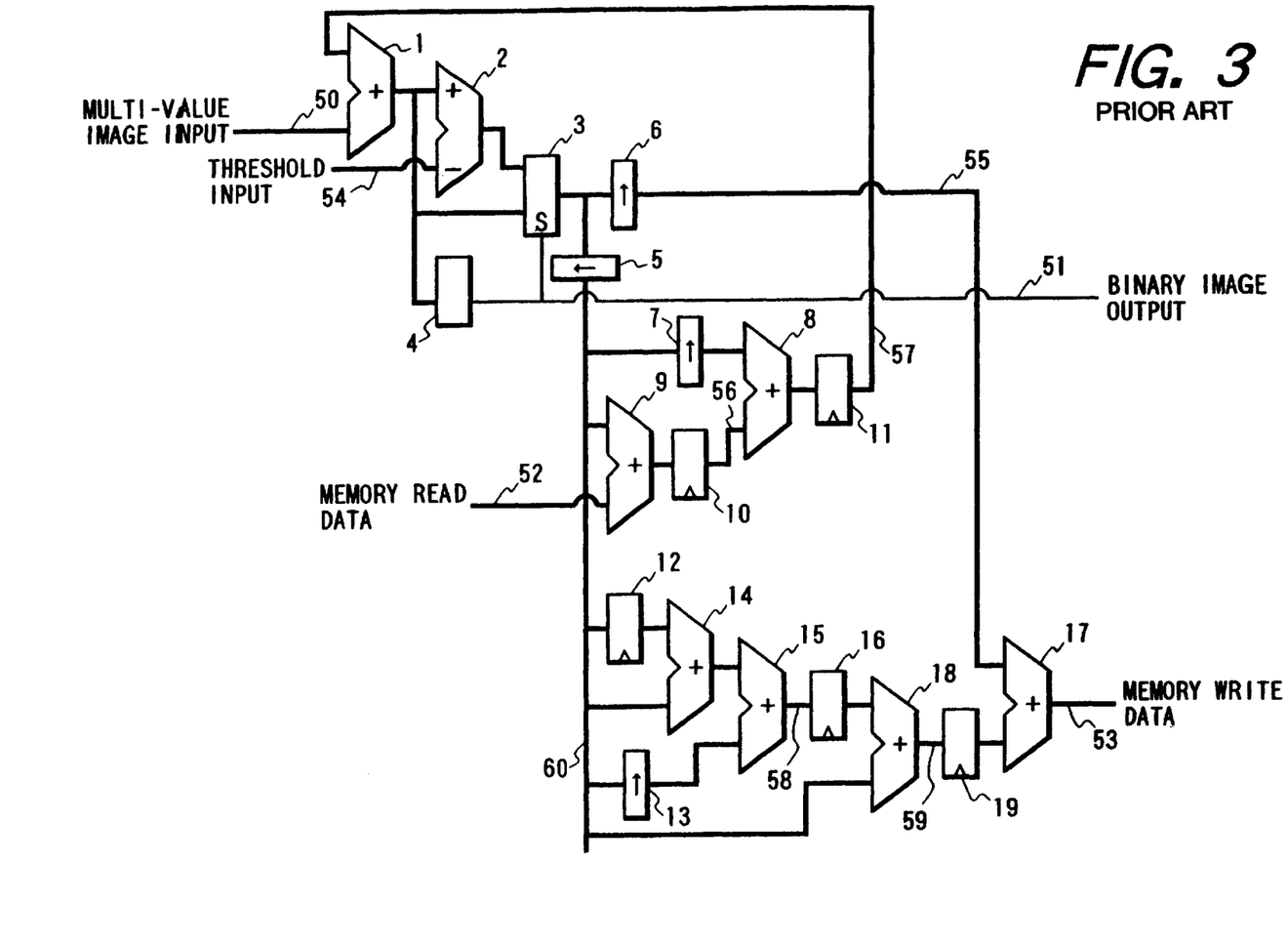
FIG. 3 is a circuit diagram showing an example of a diffused error calculation unit.

FIG. 3 shows an example of a part of a circuit for performing the error diffusing process in accordance with the error diffusing mask shown in FIG. 2 and also shows an example of a diffused error calculation unit of the prior art shown in FIG. 1.

In FIG. 3, reference numeral 1 denotes an adder for adding errors to be distributed to the target pixel 2 a subtracter for obtaining negative errors which the target pixel has; 3 a selector for selecting positive and negative errors of the target pixel by the decided color of the target pixel; and 4 a comparator for deciding the color of the target pixel. An output of the comparator 4 becomes a selection signal of the selector and also becomes a binary output. Reference numeral 5 denotes a shifter for shifting the value of the target pixel to the right by three bits (an arithmetic operation of ⅛ by a bit arithmetic operation); 6 a shifter for obtaining the remainder which occurs when the errors of the target pixel are distributed to the peripheral pixels; 7 a shifter for shifting the value which was shifted to the right by three bits to the left by one bit (an arithmetic operation of two times by the bit arithmetic operation); 9 an adder for adding the value shifted to the right by three bits and the memory read data designated by reference numeral 52 as errors distributed from the preceding line; 10 a delay circuit for delaying an output of the adder by the time corresponding to one clock; 8 an adder for adding the value shifted to the left by one bit and an output of the delay circuit; 11 a delay circuit for delaying an output of the adder by the time of one clock; 12 a delay circuit for delaying the value shifted to the right by three bits by the time of one clock; 14 an adder for adding the value shifted to the right by three bits and an output of the delay circuit; 13 a shifter for shifting the value shifted to the right by three bits to the left by one bit (the arithmetic operation of two times by the bit arithmetic operation); 15 an adder for adding an output of the adder and an output of the shifter; 16 a delay circuit for delaying an output of the adder by the time of one clock; 18 an adder for adding an output of the delay circuit and the value shifted to the right by three bits; 19 a delay circuit for delaying an output of the adder by the time of one clock; and 17 an adder for adding an output of the shifter to obtain the foregoing remainder and an output of the delay circuit. An output of the adder 17 corresponds to errors to be distributed to the next line and also becomes data to be written into the memory.

Figure 4:
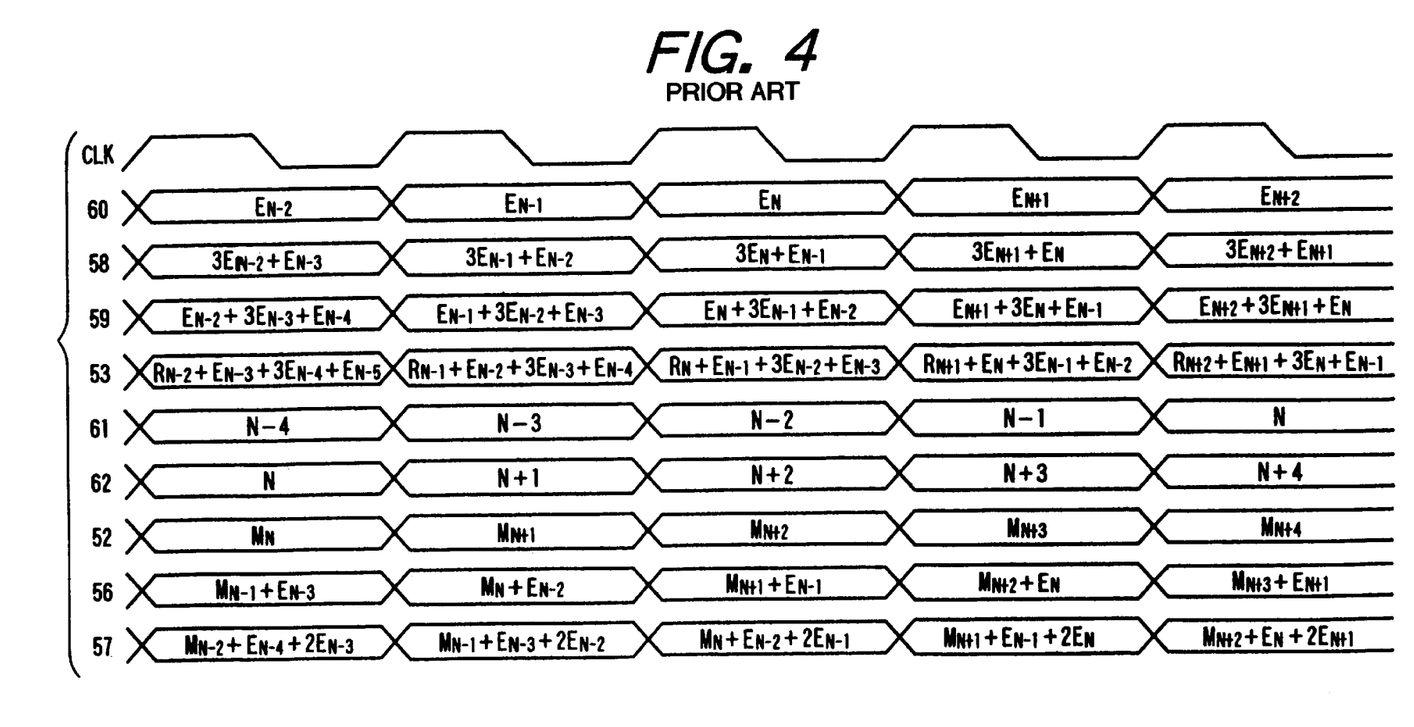
FIG. 4 is a timing chart showing the operation in FIG. 3.

FIG. 4 is a timing chart for a step of calculating binary outputs according to the error diffusing method. In FIG. 4, CLK at the top stage denotes a clock signal (not shown) which is supplied to the one-clock delay circuit in FIG. 3 and the circuit shown in FIG. 3 operates synchronously with the clock. Reference numeral 60 in FIG. 4 denotes a value (hereinbelow, this value is called a unit error) of the signal line 60 and corresponds to the value shifted to the right by three bits of the errors of the target pixel and $E_N$ in the diagram denotes a unit error of the N-th pixel. Reference numeral 58 in FIG. 4 denotes a value of a signal line 58 in FIG. 3 and $3E_{N+2}+E_{N+1}$ in the diagram indicates a value obtained by adding the error which is three times as large as the unit error that of the (N+2)th pixel and the unit error of the (N+1)th pixel. Reference numeral 59 in FIG. 4 denotes a value of a signal line 59 and $E_{N+2}+3E_{N+1}+E_N$ in the diagram indicates a value obtained by adding the unit error of the (N+2)th pixel, the value which is three times as large as the unit error of the (N+1)th pixel, and the unit error of the N-th pixel. Reference numeral 53 in FIG. 4 denotes a value of the signal line 53 in FIG. 3 and $R_{N+2}+E_{N+1}+3E_{N+EN-1}$ in the diagram indicates a value obtained by adding the remaining errors of the errors distributed to the peripheral pixels from the (N+2)th pixel, the unit error of the (N+1)th pixel, the value which is three times as large as the unit error of the N-th pixel, and the unit error of the (N−1)th pixel. Such a value corresponds to an error to be added to the N-th pixel of the next line and, consequently, is written into the memory. Reference numeral 61 in FIG. 4 denotes a value of the write address signal line 61 in FIG. 1 and indicates that the data to be written into the memory corresponds to data for which number of pixel. Reference numeral 52 in FIG. 4 denotes a value of the signal line 52 in FIG. 3 and $M_N$ in the diagram indicates the read data for the N-th pixel. Reference numeral 56 in FIG. 4 denotes a value of a signal line 56 in FIG. 3 and $M_{N-1}+E_{N-3}$ in the diagram indicates a value obtained by adding the read data for the (N−1)th pixel and the unit error of the (N−3)th pixel. Reference numeral 57 in FIG. 4 denotes a value of a signal line 57 in FIG. 3 and $M_{N-2}+E_{N-4}+2E_{N-3}$ in the diagram indicates a value obtained by adding the read data for the (N−2)th pixel, the unit error of the (N−4)th pixel, and a value which is two times as large as the unit error of the (N−3)th pixel.

Reference numeral 62 in FIG. 4 denotes a value of the read address signal line 62 in FIG. 1 and indicates that the data to be read out from the memory corresponds to data for which number of data.

In this manner, when the multi-value image is binarized by the error diffusing method, in order to calculate an error for each pixel, the writing and reading operations have to be executed for the memory in all processing cycles.

Consequently, in the prior art, as a memory device to store error data, a memory device having a plurality of input/output ports of a low integration degree, namely, a memory device in which an occupied area of a memory cell for storing data of one bit on one chip is large and an occupied area of a processing circuit is also large has to be used. Thus, a circuit scale is increased and it is difficult to realize an integration, namely, a miniaturization of an IC chip.

SUMMARY OF THE INVENTION

It is an object of the invention to provide a binarizing apparatus which can convert a multi-value image to a binary image at a high speed without using a memory device having a plurality of I/O ports and which is suitable for integration.

According to the invention, there is provided a binarization processing apparatus for converting multi-value image data into binary image data, comprising: pixel groups in which a plurality of pixels to be binarized are divided into a plurality of groups; a plurality of memory means which correspond to the pixel groups and hold data in a binarization processing step; and control means which performs a reading operation for one of the plurality of memory means and simultaneously performs a writing operation for the other memory means.

The apparatus can also have the following construction as necessary.

The apparatus has means for performing the foregoing converting process on the basis of an error diffusing method.

The plurality of memory means have a single common I/O port.

There is also provided a binarization processing apparatus for converting multi-value image data into binary image data by an error diffusing method, comprising: memory means which has a single I/O port and is provided as two-divided memory means of memory means for odd-number designated pixels and memory means for even-number designated pixels; and control means for controlling the memory means in a manner such that when error data of the odd-number designated pixels is written, errors of the even-number designated pixels are read out and, when error data of the even-number designated pixels is written, errors of the odd-number designated pixels are read out.

The apparatus can further have: a luminance density switching unit which operates in a manner such that when input data is luminance information, the luminance information is converted into density information and when input data is density information, a value of the input data as it is is switched and supplied to a γ-conversion unit; the γ-conversion unit for converting the density information which is inputted into a better density change in accordance with characteristics of an image; a diffused error calculation unit for calculating diffused errors; an address generation unit for generating an address to read or write diffused error data; first and second memories provided for odd pixels and even pixels; and a data control unit for alternately performing the reading and writing operations of the first and second memories in a manner such that when the writing operation is performed to the first memory, the reading operation is executed to the second memory and, when the reading operation is performed to the first memory, the writing operation is executed to the second memory.

In addition, the first memory and second memory are used for the odd pixels and for the even pixels, respectively. A pixel of error data which is desired to be read out and a pixel of error data which is desired to be written can be deviated by a distance corresponding to odd pixels.

DETAILED DESCRIPTION OF THE PREFERRED EMBODIMENTS

A preferred embodiment of the invention is characterized in that memory means having a single input/output port is divided to two memory means of memory means for a certain pixel group and memory means for another pixel group and they are operated in a manner such that when error data of one certain pixel group is written, errors of the other pixel group are read out and, when error data of the other pixel group is written, errors of one certain pixel group are read out.

Consequently, since it is unnecessary to simultaneously perform the reading and writing operations for one memory means, an operation such that a high-speed binarizing apparatus suitable for integration can be provided is obtained.

Since memory means having a plurality of I/O ports and a low integration degree is not used as memory means for storing error data, a circuit scale doesn't increase, so that an operation and effect such that an. integration can be easily realized is obtained.

Embodiment 1

Figure 5:
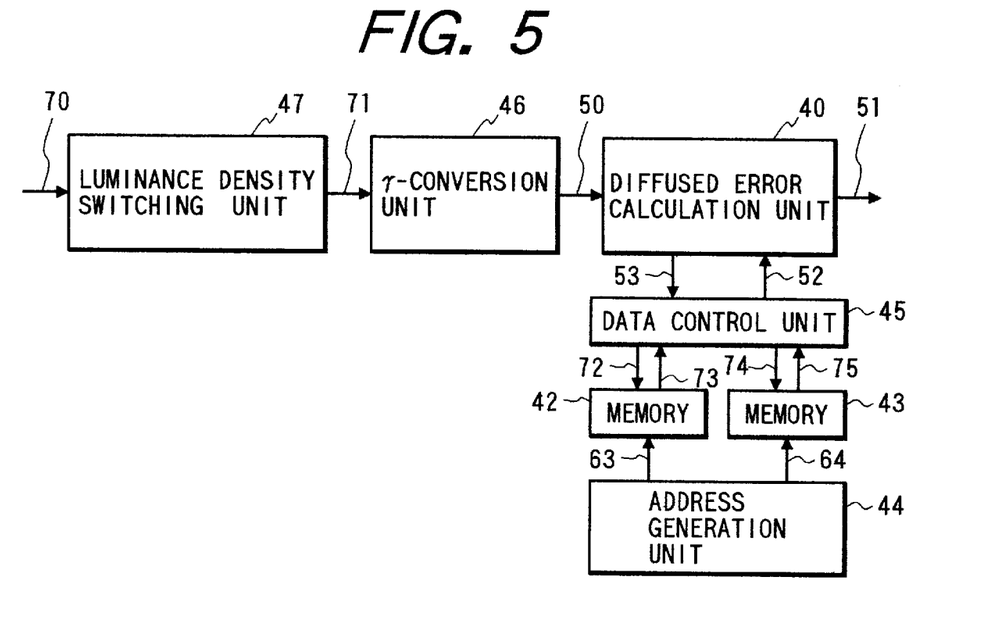
FIG. 5 is a diagram showing an example of a binarization processing apparatus according to the invention.

FIG. 5 is a block diagram showing most preferably a feature of the invention. In the diagram, reference numeral 40 denotes the diffused error calculation unit for calculating diffused errors; 45 a data control unit, which will be described in detail hereinlater; 42 a first memory; 43 a second memory (elements 45, 42 and 43 form the memory means having a single input/output port and divided into two memory means); 44 the address generation unit for generating an address to read or write diffused error data; 46 a gamma conversion unit, provided as necessary, for converting density information which is inputted into a better density change in accordance with characteristics of an image; and 47 a luminance density switching unit which is provided as necessary and operates in a manner such that when input data is luminance information, the input data is converted into density information and, when the input data is the density information, a value of the density information as it is is switched and generated to the γ-conversion unit.

The reading and writing operations of the first and second memories are alternately performed by the data control unit. That is, when the writing operation is executed for the first memory, the reading operation is executed for the second memory and, when the reading operation is executed for the first memory, the writing operation is executed for the second memory.

Figure 6:
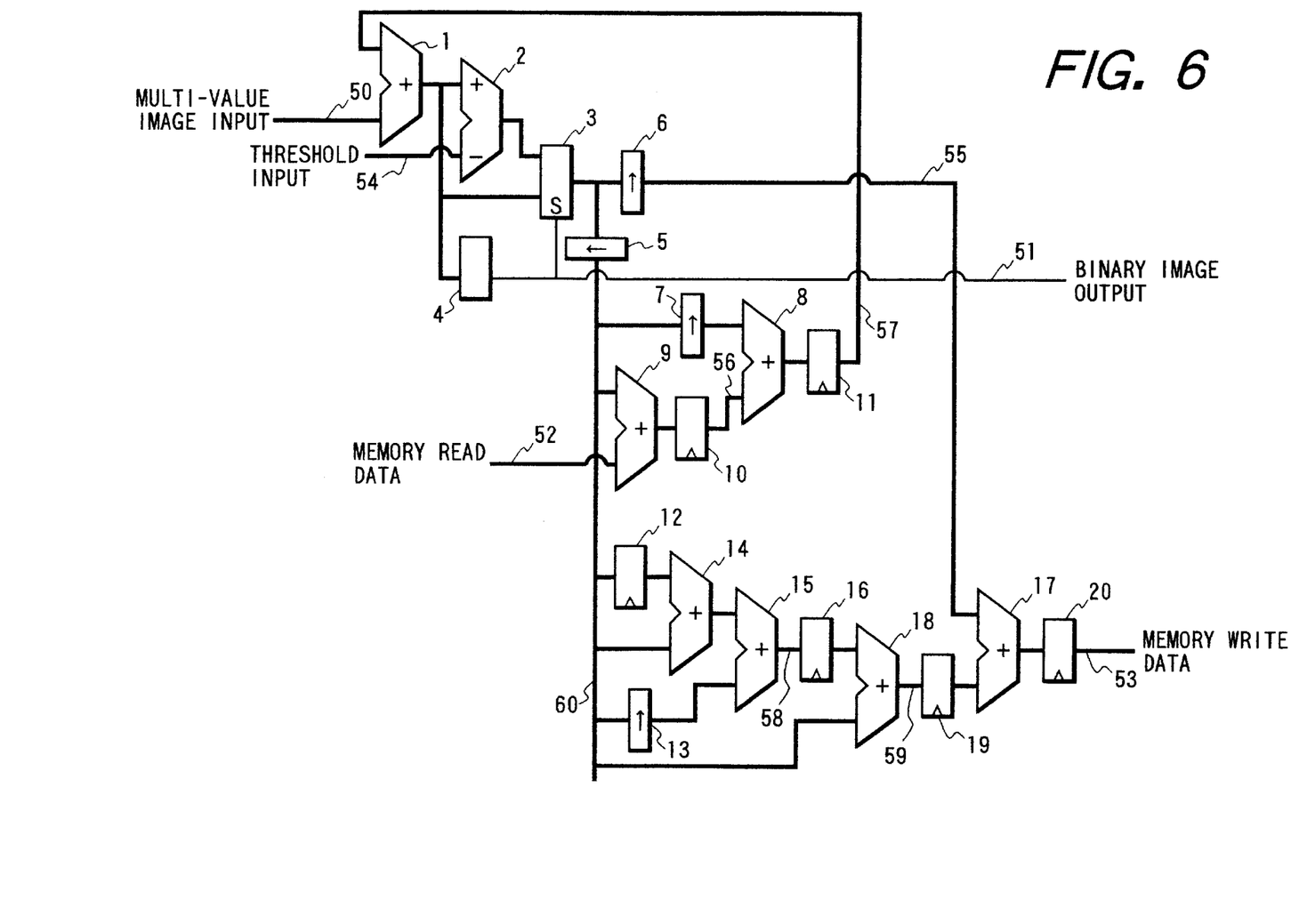
FIG. 6 is a circuit diagram showing an example of a diffused error calculation unit used in the invention.

FIG. 6 shows an example of a circuit of the diffused error calculation unit 40 in FIG. 5. In FIG. 6, reference numeral 1 denotes the adder for adding errors to be distributed to a target pixel to the target pixel; 2 the subtracter for obtaining negative errors which the target pixel has; 3 the selector for selecting positive and negative errors of the target pixel on the basis of the decided color of the target pixel; and 4 the comparator for deciding the color of the target pixel. An output of the comparator 4 becomes a selection signal of the selector and also becomes a binary output. Reference numeral 5 denotes the shifter for shifting the value of the target pixel to the right by three bits (the arithmetic operation of ⅛ by the bit arithmetic operation); 6 the shifter for obtaining the remainder which occurs when the errors of the target pixel are distributed to the peripheral pixels; 7 the shifter for shifting the value which was shifted to the right by three bits to the left by one bit (the arithmetic operation of two times by the bit arithmetic operation); 9 the adder for adding the value shifted to the right by three bits and the memory read data designated by reference numeral 52 as errors distributed from the preceding line; 10 the delay circuit for delaying an output of the adder by the time corresponding to one clock; 8 the adder for adding the value shifted to the left by one bit and an output of the delay circuit; 11 the delay circuit for delaying an output of the adder by the time of one clock; 12 the delay circuit for delaying the value shifted to the right by three bits by the time of one clock; 14 the adder for adding the value shifted to the right by three bits and an output of the delay circuit; 13 the shifter for shifting the value shifted to the right by three bits to the left by one bit (the arithmetic operation of two times by the bit arithmetic operation); 15 the adder for adding an output of the adder and an output of the shifter; 16 the delay circuit for delaying an output of the adder by the time of one clock; 18 the adder for adding an output of the delay circuit and the value shifted to the right by three bits; 19 the delay circuit for delaying an output of the adder by the time of one clock; and 17 the adder for adding an output of the shifter to obtain the remainder and an output of the delay circuit; 20 a delay circuit for delaying an output of the adder by the time of one clock. An output of the delay circuit 20 corresponds to errors to be distributed to the next line and also becomes data to be written into the memory.

Figure 7:
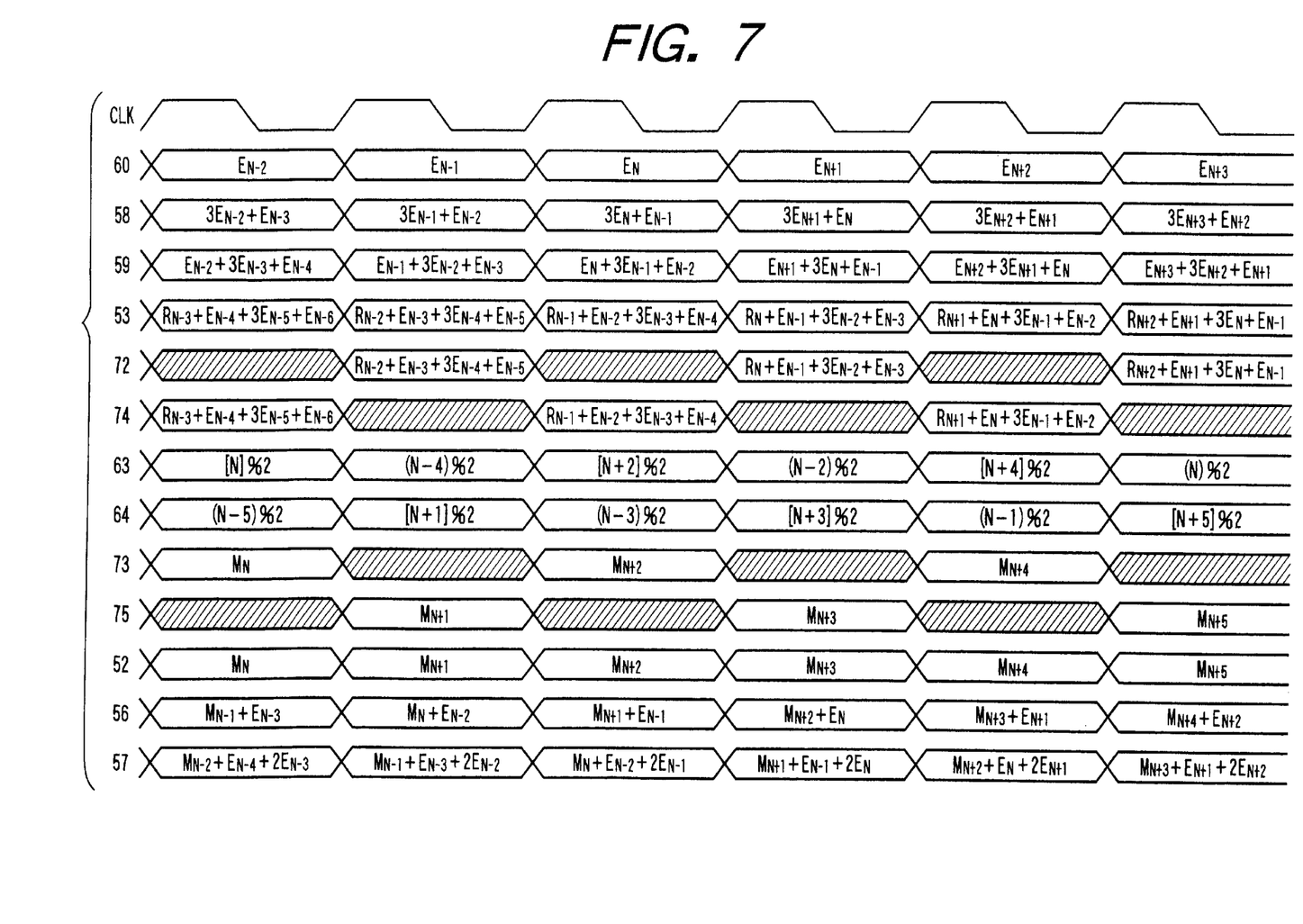
FIG. 7 is a timing chart showing the operation in FIG. 5.

FIG. 7 is a timing chart for a step of calculating a binary output by the error diffusing method in the embodiment. In FIG. 7, CLK at the top stage denotes a clock signal (not shown) which is supplied to the oneclock delay circuit in FIG. 6. The circuit shown in FIG. 6 operates synchronously with the clock.

In FIG. 7, reference numeral 60 denotes the value of the signal line 60 in FIG. 6 and corresponds to the unit error shifted to the right by three bits of the errors of the target pixel. EN in the diagram denotes the unit error of the N-th pixel. Reference numeral 58 in FIG. 7 denotes the value of the signal line 58 in FIG. 6 and $3E_{N+2}+E_{N+1}$ indicates the value obtained by adding the error which is three times as large as the unit error of the (N+2)th pixel and the unit error of the (N+1)th pixel. Reference numeral 59 in FIG. 7 denotes the value of the signal line 59 in FIG. 6 and $E_{N+2}+3E_{N+1}+E_N$ indicates the value obtained by adding the unit error of the (N+2)th pixel, the error which is three times as large as the unit error of the (N+1)th pixel, and the unit error of the N-th pixel. Reference numeral 53 in FIG. 7 denotes the value of the signal line 53 in FIG. 6 and $R_{N+2}+E_{N+1}+3E_N+E_{N-1}$ indicates the value obtained by adding the remaining errors of the errors distributed to the peripheral pixels from the (N+2)th pixel, the unit error of the (N+1)th pixel, the error which is three times as large as the unit error of the N-th pixel, and the unit error of the (N−1)th pixel. Such a value corresponds to errors to be added to the N-th pixel of the next line.

Reference numeral 72 in FIG. 7 denotes a value of a signal line 72 in FIG. 5 and indicates a value of data to be written into the first memory. Hatched portions 72 in FIG. 7 denote portions which are not cared (a specific process is not performed) and correspond to data which is not written into the memory. Reference numeral 74 denotes a value of a signal line 74 in FIG. 5 and indicates a value of data to be written into the second memory. Hatched portions 74 in FIG. 7 denote portions which are not cared and correspond to data which is not written into the memory. Reference numeral 73 in FIG. 7 denotes a value of a signal line 73 in FIG. 5 and indicates data which is read out from the first memory. Hatched portions 73 in FIG. 7 indicate portions which are not cared and in which it is unnecessary to newly read out data from the memory. Reference numeral 75 in FIG. 7 denotes a value of a signal line 75 in FIG. 5 and indicates data which is read out from the second memory. Hatched portions 75 in FIG. 7 are portions which are not cared and in which it is unnecessary to newly read out data from the memory. Reference numeral 63 in FIG. 7 denotes a value of a signal line 63 in FIG. 5 and corresponds to an address signal which is supplied to the first memory. Reference numeral 64 in FIG. 7 indicates a value of a signal line 64 in FIG. 5 and corresponds to an address signal which is supplied to the second memory.

The address shown by [ ] in the diagram denotes the address for reading out and the address designated by ( ) indicates the address for writing. That is, [N] in 63 in FIG. 7 indicates the read address for the N-th pixel and (N−4) denotes the write address for the (N−4)th pixel. % 2 denotes that the address which is actually supplied to the memory is an integer part when the value indicative of the pixel is divided by 2. A depth of the address of each of the first and second memories is equal to the half of the number of horizontal pixels. By adding them, a memory area corresponding to the number of horizontal pixels is obtained.

In this instance, as for the address which is supplied to the first memory and the address which is supplied to the second memory, when one of them is the address for writing, the other address is the address for reading. The address for reading and the address for writing are away from each other by a distance of only five pixels as odd-number pixels.

Reference numeral 52 in FIG. 7 denotes the value of the signal line 52 in FIGS. 5 and 1 and indicates a value obtained by alternately selecting the data which is read out from the first memory and the data which is read out from the second memory every effective range by the data control unit. MN in the diagram indicates the read data for the N-th pixel. Reference numeral 56 in FIG. 7 denotes the value of the signal line 56 in FIG. 6 and $M_{N-1+E_{N-3}}$ in the diagram indicates the value obtained by adding the read data for the (N−1)th pixel and the unit error of the (N−3)th pixel. Reference numeral 57 in FIG. 7 denotes the value of the signal line 57 in FIG. 6 and $M_{N-2}+E_{N-4}+2E_{N-3}$ in the diagram indicates the value obtained by adding the read data for the (N−2)th pixel, the unit error of the (N−4)th pixel, and the error which is two times as large as the unit error of the (N−3)th pixel.

Embodiment 2

Although the embodiment 1 has been explained with respect to the example in which two memory devices for odd-number pixels and for even-number pixels have been used, it will be obviously understood that a higher operating speed can be realized by dividing the memory devices into a large number of devices.

For example, it is also possible to construct in a manner similar to the embodiment 1 by providing a memory device obtained by dividing into, when the pixel position address is divided by 4, a memory for pixels of the remainder "0", a memory for pixels of the remainder "1", a memory for pixels of the remainder "2", and a memory for pixels of the remainder "3", or the like.

Figure 8:
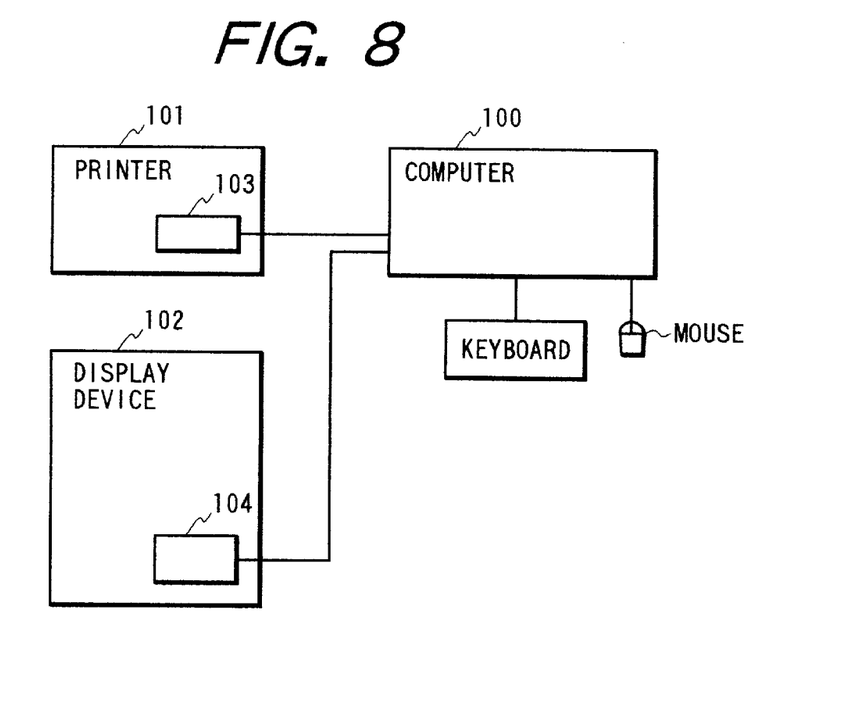
FIG. 8 is a diagram showing an image processing system having the binarization processing apparatus of the invention.

A block diagram of FIG. 8 shows a control system of an image processing system having the binarization processing apparatus of the invention. Reference numeral 100 in the diagram denotes a computer such as a personal computer or the like; 101 an apparatus such as laser printer, LED printer, liquid crystal printer, ink jet printer, or the like; and 102 a display device such as liquid crystal display device, plasma display device, or the like. The binarization processing apparatus of the invention is installed to at least either one of the devices 101 and 102 as a one-chip IC or a substrate on which a plurality of ICs are mounted. Each of reference numerals 103 and 104 indicates a state in which the binarization processing apparatus is connected to the printer or display device as an image processing card. Such an image processing card can be also installed to expansion slots of the PCI bus, ISA bus, VL bus, and the like of the computer. Particularly, the invention is suitable to an apparatus in which one dot is displayed as a binary value such as a liquid crystal display device having a memory performance which is represented by an ink jet printer or a chiral smectic liquid crystal display device.

According to the invention as mentioned above, by making the foregoing first and second memories correspond to the different pixels and deviating the pixels of the error data to be read out and the pixels of the error data to be written, it is unnecessary to simultaneously perform the reading and writing operations from/to one memory and to use a memory having a plurality of I/O ports and a low integration degree. Thus, an effect such that an integrated circuit can be easily realized without decreasing the operating speed is obtained.

The memory devices are not limited to the two memories for odd-number pixels and for even-number pixels. By dividing the memory device into a further large number of memories, a higher operating speed can be realized.

What is claimed is:

1. A binarization processing apparatus for converting multi-value image data into binary image data by an error diffusing method, comprising:

memory means which has a single input/output port and is provided as two-divided memory means, wherein a first memory is used for odd-number designated pixels and a second memory is used for even-number designated pixels; and control means for controlling said memory means in a manner such that when error data of the odd-number designated pixels is written, error data of the even-number designated pixels is read out and, when error data of the even-number designated pixels is written, error data of the odd-number designated pixels is read out, wherein a difference between an address of a pixel's error data to be read out from one memory and an address of a pixel's error data to be written in the other memory is a value corresponding to the odd-number pixels, except for a value of one.

2. An apparatus according to claim 1, including:

a luminance density switching unit which operates in a manner such that when input data is luminance information, said luminance information is converted into density information and when said input data is density information, a value of said input data as it is is switched and supplied to a gamma conversion unit;

said gamma conversion unit for converting the density information which is inputted into a better density change in accordance with characteristics of an image;

a diffused error calculation unit for calculating diffused errors;

an address generation unit for generating an address to read or write diffused error data;

first and second memories provided for odd-number pixels and even-number pixels; and a data control unit for alternately performing the reading and writing operations of said first and second memories in a manner such that when the writing operation is performed to said first memory, the reading operation is executed to said second memory and, when the reading operation is performed to said first memory, the writing operation is executed to said second memory.

3. An apparatus according to claim 1, or 2, wherein said binarization processing apparatus is a one-chip IC.

4. A printer having a binarization processing apparatus according to claim 1, or 2.

5. A display device having a binarization processing apparatus according to claim 1, or 2.

6. A computer having a binarization processing apparatus according to claim 1, or 2.

7. An ink jet printer having a binarization processing apparatus according to claim 1, or 2.

8. A liquid crystal display device having a binarization processing apparatus according to claim 1, or 2.

9. A binarization processing apparatus for converting multi-value image data into binary image data using an error diffusing method comprising:

memory means which has a single input/output port and includes a first memory for storing error data of odd-number designated pixels and a second memory for storing error data of even-number designated pixels; and an error diffusion processing circuit for delaying the error data, so that pixel positions of error data simultaneously read out from said memory means and the error data written into said memory means are the even-number designated pixels and the odd-number designated pixels, respectively, or the odd-number designated pixels and the even-number designated pixels, respectively.

* * * * *

UNITED STATES PATENT AND TRADEMARK OFFICE
CERTIFICATE OF CORRECTION

PATENT NO. : 5,937,146
DATED : August 10, 1999
INVENTOR(S) : TETSUYA TATENO ET AL.

It is certified that error appears in the above-identified patent and that said Letters Patent is hereby corrected as shown below:

COLUMN 1

Line 65, "pixel" should read --pixel;--.

COLUMN 2

Line 63, "which" should read --that--.

COLUMN 3

Line 10, "which" should read --that--.

COLUMN 4

Line 51, "an." should read --an--.

COLUMN 5

Line 62, "EN" should read --$E_N$--;

UNITED STATES PATENT AND TRADEMARK OFFICE
CERTIFICATE OF CORRECTION

PATENT NO. : 5,937,146
DATED : August 10, 1999
INVENTOR(S) : TETSUYA TATENO ET AL.

It is certified that error appears in the above-identified patent and that said Letters Patent is hereby corrected as shown below:

<u>COLUMN 6</u>

Line 56, "MN" should read --$M_N$--.

Signed and Sealed this

Twenty-third Day of January, 2001

Attest:

Q. TODD DICKINSON

*Attesting Officer*  *Commissioner of Patents and Trademarks*